Patented Nov. 21, 1933

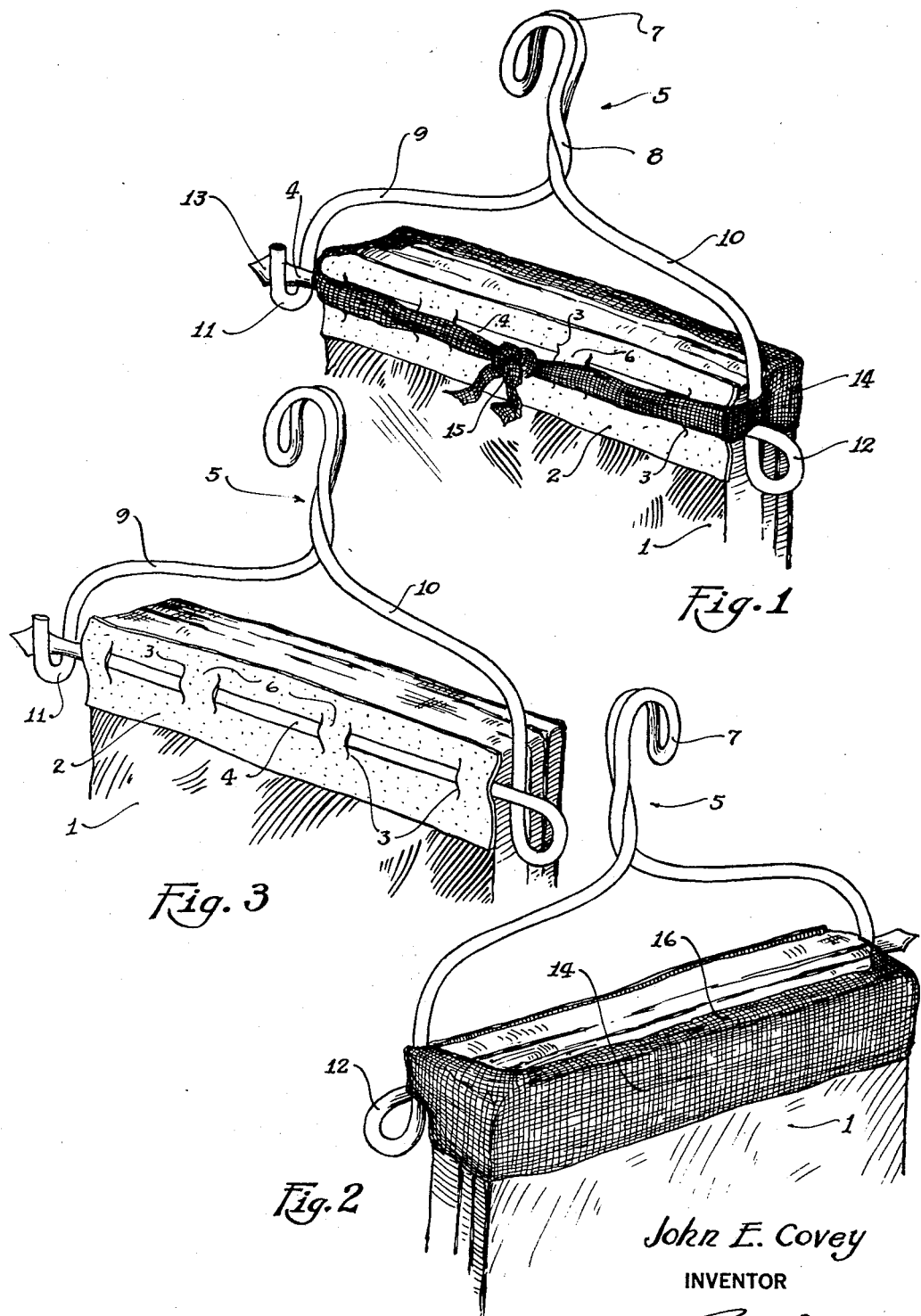

1,935,616

UNITED STATES PATENT OFFICE 1,935,616

MEANS FOR HANGING BACON

John E. Covey, Chicago, Ill., assignor to Swift and Company, Chicago, Ill., a corporation of Illinois Application October 5, 1931. Serial No. 566,955

2 Claims. (Cl. 17—44)

The invention relates to a means for hanging bacon.

The object of the present invention is to provide simple, practical and efficient means of strong, durable and comparatively inexpensive construction adapted for hanging slabs of bacon for smoking, curing and storing without mutilating the belly end of the side or slab with hook holes, thereby eliminating the waste to the dealer which these holes create.

A further object of the invention is to provide for suspending slabs of bacon a method and means which will not only eliminate the aforesaid waste, but which will effectually prevent curling of the slab of bacon while processing the same.

The present invention while designed particularly for the production of skinned bacon is equally applicable to the production of bacon upon which the skin is permitted to remain. The conventional bacon of commerce as is well known, is produced by curing and smoking that portion of the hog carcass known as the belly, two sides of bacon being produced from each hog.

Bacon is marketed in either the slab or sliced. Much of the bacon produced in the packing house is sliced and packed in the packing house, being shipped by the packing house to large quantity consumers or retailers.

Sliced bacon must be produced in condition for immediate use without further trimming by the consumer. Inasmuch as the skin or rind is inedible by reason of its toughness, it must be removed before the bacon is sliced. Slab bacon is ordinarily sold by the packer to the retailer without removing the skin which is permitted to remain to protect the bacon and minimize the weight losses.

Usually the skinned bellies are skinned before curing in order that use may be made of the skin, but may be removed either before or after smoking. In conventional packing house practice, whether or not the skin is removed, a comb hanger or toothed instrument is attached to one end of the product by inserting the nail-like teeth of the hanger entirely through the product, the product then being suspended in smoke by the hanger, as it is necessary that the product be well secured in order to withstand the ordinary handling in processing. Such insertion of the teeth of a comb hanger entirely through one end of the belly results in unsightly holes which cause the grading down and sometimes utter loss of perhaps one pound on each belly.

In ordinary commercial practice, large scale retailers of bacon purchase skinned bellies in the slab form from the packer and regularly return and receive credit for the end through which the teeth have been inserted.

Such returned product must be disposed of by the packer at a greatly reduced price. This is a considerable item inasmuch as a considerable quantity of bacon is sliced at the packing house or by large scale retailers.

The present invention avoids such unsightly holes in the product in both skinned and unskinned bellies and in the preferred form of the invention, as practiced in connection with skinned bellies, all of the skin is removed with the exception of a narrow strip about one inch wide across one end of the slab of bacon, whereby the slab may be suspended by the method and means of the present invention for smoking, curing or storing without in any way damaging the product which is later to be sliced.

With these and other objects in view, the invention consists in the construction and novel combination and arrangement of parts hereinafter described, illustrated in the accompanying drawing, and set forth in the claims hereto appended, it being understood that various changes in the form, proportion and minor details of construction, within the scope of the claims, may be resorted to without departing from the spirit of the invention or sacrificing any of the advantages thereof.

In the drawing:—

Figure 1 is a perspective view of a bacon hanger constructed in accordance with the present invention and shown applied to a slab of bacon and viewed from the skinned side thereof.

Fig. 2 is a similar view viewed from the lean side of the slab.

Fig. 3 is a perspective view of the bacon hanger and slab, the cloth being removed to illustrate clearly the arrangement of the skewer.

Referring to the drawing in which is illustrated the preferred embodiment of the invention, 1 designates a belly or bacon slab having all of the skin removed with the exception of a narrow strip 2 about one inch wide extending across the slab 1 at one end thereof. The narrow strip 2 is slit at intervals to form narrow ribbon-like cuts 3 to permit a skewer 4 of a hanger 5 to be laced through the said narrow strip 2. The cuts 3 which are vertical are preferably located adjacent the ends of the strip 2 and in pairs at intervals intermediate the ends of the strip to provide narrow vertically disposed partially severed portions 6 beneath which the skewer 4 is passed so that the major portion of the skewer will lie exteriorly of the narrow strip 2 of skin and a minimum portion of the skewer will be permitted to come in contact with the edible portion of the slab 1.

The hanger 5 and the skewer 4 which constitutes the bottom supporting portion of the hanger are formed from a single piece of stout wire or other suitable material which is doubled and bent intermediate of its ends to form a supporting hook 7 composed of two sides which are twisted together at the shank portion 8 of the supporting hook. The wire is extended outwardly and downwardly from the lower end of the shank 8 to form supporting arms 9 and 10 and the lower terminal portion of the hanger arm 9 is bent backward on itself into approximately U-shape to form a keeper 11 for the free end of the skewer of the safety-pin hanger.

The wire which is resilient is partially coiled or bent at the lower or outer end of the other hanger arm 10 to form a spring loop 12 and it is then extended across the bottom of the hanger to provide the said skewer 4 of the safety-pin hanger. The skewer 4 of the safety-pin hanger has its free terminal portion 13 pointed to enable it to be readily passed through the hard portion of the fatty tissue in rear of or beneath the narrow strip 2 of skin and the resiliency of the spring loop 12 of the safety pin hanger maintains the pointed terminal portion 13 in engagement with the keeper 11. Also the weight of the slab when suspended by the hanger will maintain the skewer or pin portion in engagement with the keeper.

The skewer 4 which is straight provides a form for maintaining the slab of bacon flat or straight while the bacon is being processed or cured and the belly or slab is maintained firmly against the straight skewer 4 by means of a fabric binding member 14 preferably consisting of a strip of coarse woven cloth similar to regular ham sling cloth, but any other suitable fabric or woven material may, of course, be employed as a binding member for holding the belly or slab of bacon firmly against a straight skewer to prevent curling or distortion while curing or processing the slab or belly.

The flexible fabric 14 passes around the lean side of the slab and across the side edges thereof and has its terminal portions extended across the skin side of the slab and preferably secured together at the center thereof by knotting as shown at 15, but any other suitable fastening means may, of course, be employed and if desired, the terminals of the fabric may be fastened to the side portions of the hanger. In the arrangement illustrated in Fig. 1 of the drawing, the terminal portions of the flexible binding fabric extend along the strip 2 centrally thereof in front of the skewer 4. The said terminal portions which extend along the strip 2 of skin are preferably narrower than the main body portion which passes around the lean side of the slab.

The body portion of the binding and clamping fabric is provided with a top marginal portion 16 arranged upon the upper end of the slab of bacon at the lean side and side edges thereof so that the fabric binding and clamping member partially encases the upper end of the slab and is adapted to firmly clamp the slab against the skewer which operates as a form or straightening bar whereby curling or distortion of the belly or slab of bacon while curing is effectually prevented.

It will thus be seen that the device of the present invention enables the bacon to be suspended for smoking, curing and storing without mutilating or otherwise injuring the end of the bacon and at the same time enables the bacon to be cured or processed without curling as the straight skewer and fabric binding member cooperate in maintaining the belly or slab of bacon in a flat condition while the bacon is suspended.

The labor incident to severing the strip 2 of skin from the slab of bacon is very small and this strip 2 of skin may, of course, be removed when the bacon is sliced. Any suitable means may, of course, be provided for making cuts 3 in the narrow strip 2.

The safety-pin skewer hanger and fabric binding member while designed particularly for skinned slabs of bacon having narrow strips of skin at one end may, of course, be employed for hanging unskinned slabs of bacon provided with the cuts 3 arranged at one end of the slab in the position illustrated in Figs. 1 and 3 of the drawing.

While the fabric binding member is shown applied to a hanger having an integral skewer it will be readily understood that the fabric binding and clamping member is equally applicable to any form of hanger having a skewer, whether or not the latter is integral with the hanger. In the form of the invention illustrated in the accompanying drawing, the fabric binding member crosses the side edges of the slab above the skewer and is carried by the hanger as the skewer thereof will effectually prevent the fabric from being displaced by any downward movement of the fabric on the slab.

From what has preceded and also from an inspection of the drawing it will be noted that an assemblage of a bacon slab and associated hanger is effectively employed during the treatment, curing and handling of bacon slabs and that in this assemblage according to certain aspects of the invention the bacon slab is partially dehided or derinded, while according to other aspects of the invention the bacon slab is not necessarily dehided to any extent. In order that the upper portion of the bacon slab will be properly shaped and maintained in proper shape there is brought into the assemblage the flexible fabric 14 which serves the function of shaping the upper end of the slab and of insuring a clamping effect of the upper end of the slab against the long straight skewer or pin member. It will also be noted that a further advantage exists in the assemblage, particularly in the instance where only a narrow strip of hide or rind is left at the upper end of the slab in that the clamping effect of this band can be relied upon for preventing a tearing away of the narrow strip of hide from the fatty portion of the slab thus insuring a proper assemblage of the hanger in respect to the slab during all desired treatment or handling of the slab. This flexible fabric 14 is knotted as at 15, whereby a tight band results. It will also be noted that this band extends the full width of the bacon slab along the rear upper portion thereof thence forwardly along an upper edge or side portion of the slab outside of the lower end of hanger or supporting arm 10—and in fact above the outwardly extending loop 12 by which the skewer or pin member 4 is integrally connected to the lower end of arm 10—, thence transversely along the skin at the skewer receiving or engaging section thereof thence over the free end of the skewer or pin member under or inside of the lower end of the hanger or supporting arm 9 across the upper side end or edge of the slab thus completing the band and it will be noted that the positioning of the lower end of the arm 10 under this fabric band serves to position the hanger in reference to the slab whereby any tendency for shifting of the hanger and the skewer or pin member thereof relative to the slab is avoided.

What is claimed is:

1. In the preparing and treating of bacon slabs, the assemblage comprising a slab of bacon, a safety-pin type of hanger, and a fabric band; said slab of bacon being dehided except for a narrow transversely extending strip of hide that is left at the upper end of the slab and said strip being provided along a central transversely extending section with vertically extending spaced slits arranged so as to leave a line of narrow ribbon-like loop providing skin sections, the ends of each loop being integral with the skin above and below the slits; the safety-pin type of hanger having a supporting hook at the top, supporting arms depending from and spreading outwardly from said hook, and a skewer or pin member integral with the lower end of one of said depending arms and connected therewith through the medium of a loop portion that extends outwardly beyond a downwardly extending section of the supporting arm, the other supporting arm having at the lower end thereof a reversely bent section providing a hook for the reception of the free end of the skewer or pin member; and said assemblage the skewer or pin member being threaded under the loops but positioned so that except for said looped portions the skewer or pin member engages the outer side of the skin section; the fabric band being arranged so as to tightly encircle the upper end of the slab and so that it extends along the upper meat section of the slab—slightly overlapping the upper end of the slab—thence across an upper outer side portion of the slab outside of one of said depending supporting arms and above the outwardly extending loop connection between said last mentioned supporting arm and the skewer or pin member connected thereto, thence along the outside of the upper skin side of the slab, thence above the free end of the pin and finally across the other upper outer side portion of the slab.

2. In the treatment of bacon slabs the assemblage which comprises a bacon slab, a safety-pin type of skewer hanger, and a fabric band encircling the upper end section of the slab; said slab having thereupon at least a portion of the hide or rind, which hide in the region of the upper end of the slab is vertically slitted so as to leave loop providing sections, the ends of which loop providing sections are integral with the hide above and below the slits; which safety-pin type of skewer hanger comprises a supporting portion having spaced depending supporting arms, a skewer or pin member carried at the lower end of one of said supporting arms and so as to permit swinging movement of the skewer or pin member relative to the arm by which it is carried, the lower end of the other supporting arm being provided with a hook for the reception and support of the free end of the skewer or pin member; said skewer or pin member being positioned so as to extend under said loop providing portions and in a manner whereby a substantial portion of a skewer or pin extends along the outside of the skin at the sides of said loop portions; the woven fabric band being arranged so as to extend across the inner or meat side of a slab, across the upper edge portions of the slab and across the outer or hide side of the slab, said fabric being positioned and being secured sufficiently tight to effect a firm retention of the upper end of the slab towards and against the skewer.

JOHN E. COVEY.